United States Patent [19]

Inskeep

[11] Patent Number: 4,478,032
[45] Date of Patent: Oct. 23, 1984

[54] DUAL IMPLEMENT HITCH

[76] Inventor: William B. Inskeep, Rte. 4, Box 15, Culpeper, Va. 22701

[21] Appl. No.: 462,674

[22] Filed: Jan. 31, 1983

[51] Int. Cl.³ .................... A01D 7/00; A01D 78/04; B60D 1/14
[52] U.S. Cl. ............................ 56/377; 56/14.9; 56/DIG. 21; 280/411 C; 280/467; 172/679
[58] Field of Search ............... 56/14.9, 15.1, 15.3, 56/15.5, 6, 228, 377, 376, DIG. 14; 172/677, 679, 311; 280/411, 412, 413, 656, 42 BB, 467, 472

[56] References Cited

U.S. PATENT DOCUMENTS

| | | | |
|---|---|---|---|
| 3,292,948 | 12/1966 | McMasters et al. | 280/415 R |
| 3,738,682 | 6/1973 | Ritter | 280/413 |
| 3,990,718 | 11/1976 | Holland | 280/411 R |
| 4,179,870 | 12/1979 | Rowse | 56/6 |
| 4,415,174 | 11/1983 | Koehn | 280/415 R |

FOREIGN PATENT DOCUMENTS

| | | | |
|---|---|---|---|
| 234423 | 7/1964 | Netherlands | 56/377 |
| 2047063 | 11/1980 | United Kingdom | 280/412 |

Primary Examiner—Gene Mancene
Assistant Examiner—John G. Weiss
Attorney, Agent, or Firm—Munson H. Lane, Jr.

[57] ABSTRACT

A dual implement hitch for pivotal connection to the drawbar of a towing vehicle whereby a pair of implements, such as rakes, tedders or the like may be selectively towed in one of several modes by a simple movement of an operator without disconnecting the implements from the hitch and reconnecting same in a different position. The hitch comprises an arched longitudinal frame having a clevis at its front end for connection to the towing vehicle. The rear of the longitudinal frame is rigidly supported upon an arched transverse from which is supported by dirigible wheels at its opposite ends. A first hitch element is provided at the front end of the longitudinal frame behind the clevis for pivotally connecting a first implement to the frame, beneath the arch. A second hitch element is provided at the rear of the longitudinal frame for pivotally connecting a second implement in trailing position behind the hitch. A tie rod maintains parallel relationship of the wheels. An operator is connected between the transverse frame and the tie rod for selectively moving the wheels to one of: a transport position with wheels parallel to the longitudinal axis of the hitch, a left offset position causing the hitch to track to the left, and a right offset position causing the hitch to tract to the right of the towing vehicle. Two side delivery rakes connected to the hitch may thereby be towed selectively in a transport mode, a single windrowing mode and a double windrowing mode.

17 Claims, 12 Drawing Figures

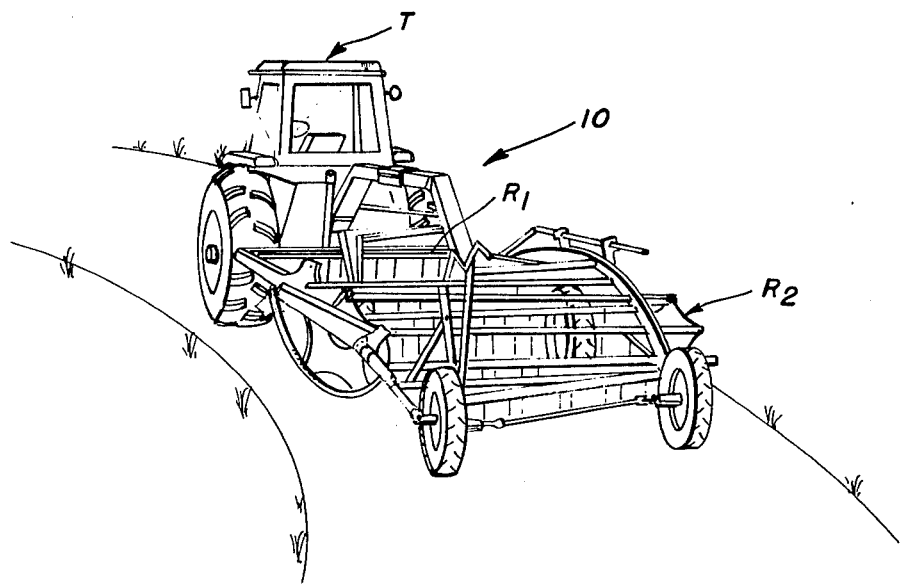
FIG. 1
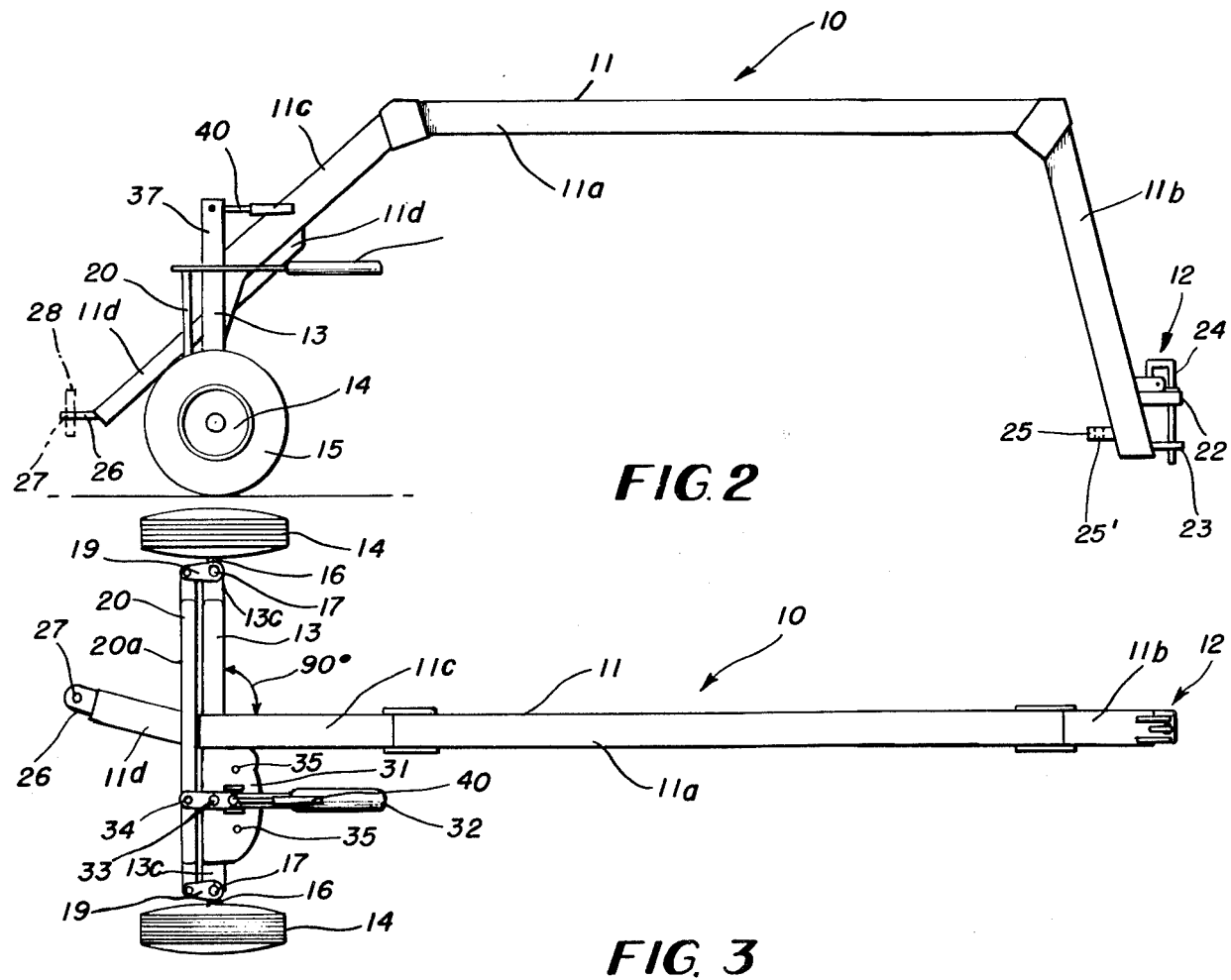
FIG. 2
FIG. 3

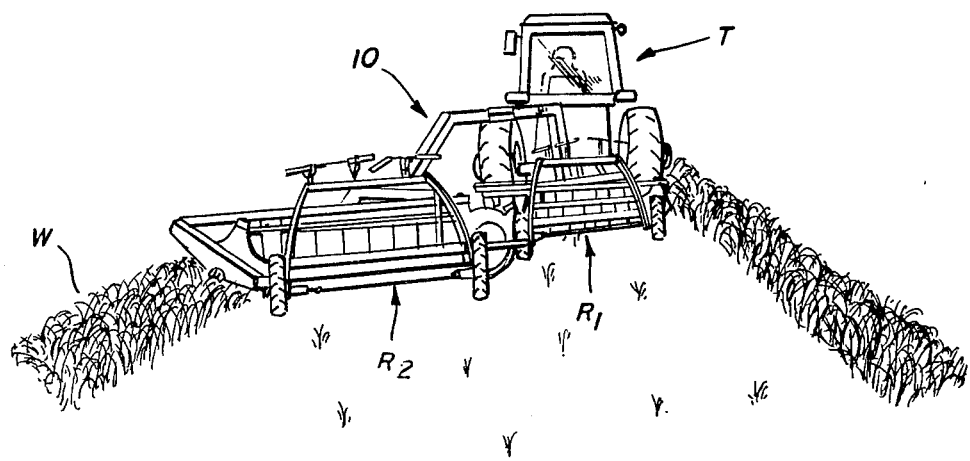
FIG. 4
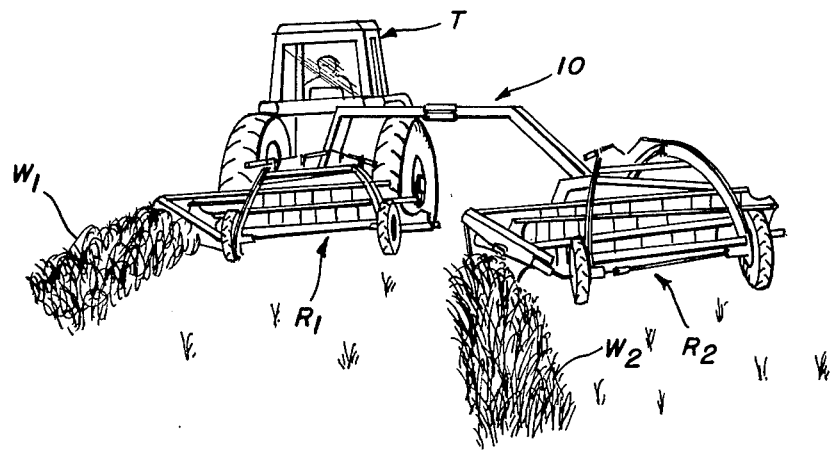
FIG. 5
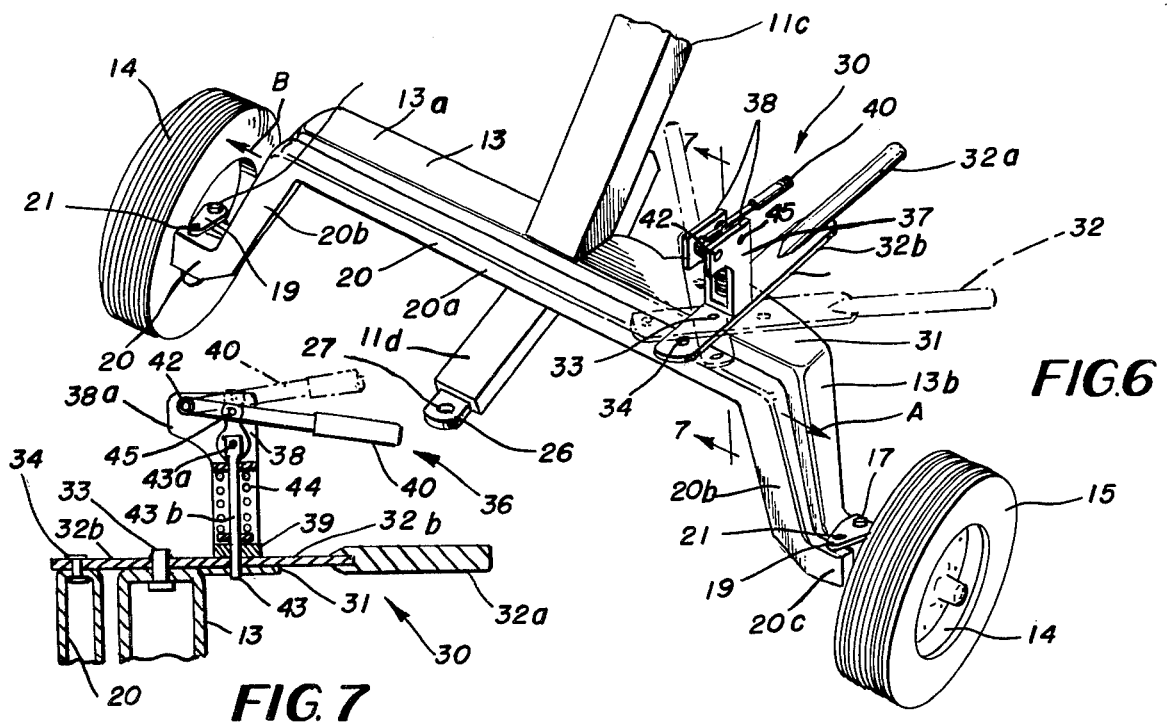
FIG. 6
FIG. 7

DUAL IMPLEMENT HITCH

BACKGROUND OF THE INVENTION

1. Field of the Invention

This invention relates to a hitch for towing a pair of wheel supported implements behind a towing vehicle selectively in one of: a transport position and either of two working positions by manual or power operation of a control device without the necessity of disconnecting, repositioning and reconnecting the implements.

More particularly the invention related to an adjustable hitch for towing a pair of side delivery rakes, or the like, selectively in one of: a transport position with one rake trailing the other in tandem, a single windrowing position with one rake trailing and offset to one side from the other to combine the hay picked up by each rake into a single windrow, and a double windrow position with one rake trailing and offset to the other side of the other rake wherein each rake delivers a separate windrow.

2. Discussion of the Prior Art

With the introduction of more powerful tractors in recent years, it has become economically important, both from the standpoint of saving time and energy to connect implements in multiple to a towing vehicle. Various hitches have been developed for this purpose which are most commonly designed for use with particular implements each of which requires that certain features be designed into the hitch to meet the requirements of the implements when being transported or when in use. For transport it is commonly required that the implements be towed in tamdem directly behind each other so as to occupy only one traffic lane of a highway, whereas for field use the implements must be offset to the right or left of each other.

The present hitch has been designed specifically for use in towing a pair of similar side delivery rakes of a type disclosed, for example, in U.S. Pat. No. 2,781,626 issued Feb. 19, 1957. The rakes each include a rotating side delivery rake reel mounted on a wheeled frame which is adapted to be towed behind a towing vehicle. If the rakes are built for left hand side delivery, one rake can be staggered to the left and rear of another rake in order that the one rake will pick up the hay delivered by the forward rake and in addition will rake up hay in the area over which it travels. This combines the output of the two rakes to produce a single large windrow. The two left hand delivery rakes can be towed with one trailing behind and offset to the right of the other so that each rake produces its own separate windrow. If the rakes are built for right hand side delivery, the trailing rake must be offset to the right in order to produce a single combined windrow, and offset to the left in order that each rake will deliver its own separate windrow.

One prior art hitch for connecting a pair of side delivery rakes to a towing vehicle generally for the purpose just described is disclosed in U.S. Pat. No. 3,077,722, issued Feb. 19, 1963 to Sadler et al. It comprises an L-shaped frame having a front transverse frame member and a longitudinal frame member extending rearwardly from one end of the transverse frame member. The frame is supported on the ground by a front caster wheel mounted on the free end of the transverse frame member, and a rear wheel rigidly secured adjacent the rear end of the longitudinal frame member. The frame is connected to the drawbar of a tractor by a bracket secured to the transverse frame member and a hitch member. Draw bars are attached to the rear of the transverse frame member adjacent to the front caster wheel for towing a first side delivery rake, and to the rear end of the longitudinal frame member for towing a second side delivery rake laterally offset from the first side delivery rake. In order to change the positions of the two rakes, connected to the hitch disclosed in U.S. Pat. No. 3,077,722, the tractor must be stopped and both rakes must be unhitched, the implement hitch must be physically turned over, and the rakes then reconnected to the hitch in different positions. Considerable time and physical labor on the part of an operator are required in repositioning the hitch and rakes.

In contrast to the hitch disclosed in U.S. Pat. No. 3,077,722, the present hitch is adjusted merely upon movement of a single control means without disconnecting the rakes from the hitch.

Other dual implement hitches of which applicant is aware are disclosed in the following U.S. Pat. Nos.:

| 3,177,828 | Cramer | Apr. 13, 1965 |
| 3,292,948 | McMasters et al | Dec. 20, 1966 |
| 3,568,423 | Hale et al | Mar. 9, 1971 |
| 3,990,718 | Holland | Nov. 9, 1976 |
| 4,178,010 | Gerber | Dec. 11, 1979 |
| 4,245,458 | Smith | Jan. 20, 1981 |

U.S. Pat. Nos. 3,568,423 and 4,245,458 disclose dual hitch frames for hay rakes which are structurally and functionaly substantially different from the present invention.

U.S. Pat. Nos. 3,177,828, 3,292,948 and 4,178,010 disclose dual hitch frames for various agricultural implements which differ structurally from the present invention particularly in the means for adjusting the hitch to reposition the towed implements without disconnecting the implements from the hitch.

SUMMARY OF THE INVENTION

It is an object of the invention to provide a dual hitch which is simple and economical in construction and which upon operation of an offset control device, manually or by power means, will tow two side delivery rakes in a selected one of: a nonworking tandem transport position; a first laterally offset position in which the output of a front rake is delivered to a trailing rake and the output of the trailing rake is a single large windrow; and a second laterally offset position is which each rake rakes and delivers a separate windrow thereby producing two windrows each of about half the volume of the single large windrow.

While the invention is described particularly for use in towing side delivery rakes, it will be obvious that the hitch of this invention may be used for towing other implements, such as tedders and others which must be towed in tandem for transport and in staggered, offset relationship for field use.

The hitch of this invention comprises an arched longitudinal frame member having a clevis at its front end for connection to the towing vehicle. The rear of the longitudinal frame member is rigidly supported upon an arched transverse frame member which is supported by dirigible wheels at its opposite ends. A first hitch element is provided at the front end of the longitudinal frame member behind the clevis for privotally connecting a first implement to the frame, beneath the arch. A second hitch element is provided at the rear of the longitudinal frame member for pivotally connecting a second implement in trailing position behind the hitch. A tie rod maintains parallel relationship of the wheels. A wheel offset control means is connected between the transverse frame member and the tie rod for selectively moving the wheels to one of: a transport position with wheels parallel to the longitudinal axis of the hitch, a left offset position causing the hitch to track to the left, and a right offset position causing the hitch to tract to the right of the towing vehicle. Two side delivery rakes connected to the hitch may thereby be towed selectively in a transport mode, a single windrowing mode and a double windrowing mode.

The wheel offset control means includes a wheel position index plate affixed to the top of the arched transverse frame member and a wheel offset control handle pivoted at one end to the tie rod and swingable over the wheel position index plate about a fulcrum intermediate, the ends of the lever. The handle includes a hand grip portion at its end opposite the end connected to the tie rod. Index holes are provided in the wheel position plate in an arc centered about the fulcrum for the handle. A spring biased latch, including a spring projected latch pin, is mounted on the wheel offset control handle with the pin in alignment with a hole through the handle. As the handle is swung over the wheel position index plate, the latch pin moves over the arc in which the index holes are located and it will be projected into one of the holes unless prevented from doing so by a latch handle. The latch handle is provided to lift the latch pin out of the index holes so that the wheel offset handle may be swung to a selected position.

The arch of the main longitudinal frame member is high enough so that the longitudinal frame member may be swung over a rake or other implement which is connected to the first hitch element. The arch of the transverse frame member is of sufficient height to clear a windrow delivered by the rake attached to the first hitch element. The tie rod is arched similarly to the transverse frame member for the same purpose and maintains a parallel relationship to the transverse frame as it is moved to position the wheels in selected positions.

While the invention is disclosed as having a manually operated wheel offset control mean, it is within the scope of this invention to provide motor operating means (not shown) for operating the wheel offset control means.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are are used to designate like parts, and in which:

FIG. 1 is a perspective view showing a pair of side delivery rakes connected to the hitch according to the invention and being towed in transport position;

FIG. 2 is a side elevational view of the hitch according to the invention;

FIG. 3 is a top plan view of the hitch according to the invention;

FIG. 4 is a perspective view showing the hitch according to the invention connecting two side delivery rakes in a single windrowing mode;

FIG. 5 is a perspective view showing the hitch according to the invention connecting two side delivery rakes in a double windrowing mode;

FIG. 6 is a perspective view, looking forwardly, of the rear end portion of the hitch according to the invention;

FIG. 7 is a cross sectional view taken on line 7—7 of FIG. 6;

DETAILED DESCRIPTION OF THE INVENTION

Figure 8:
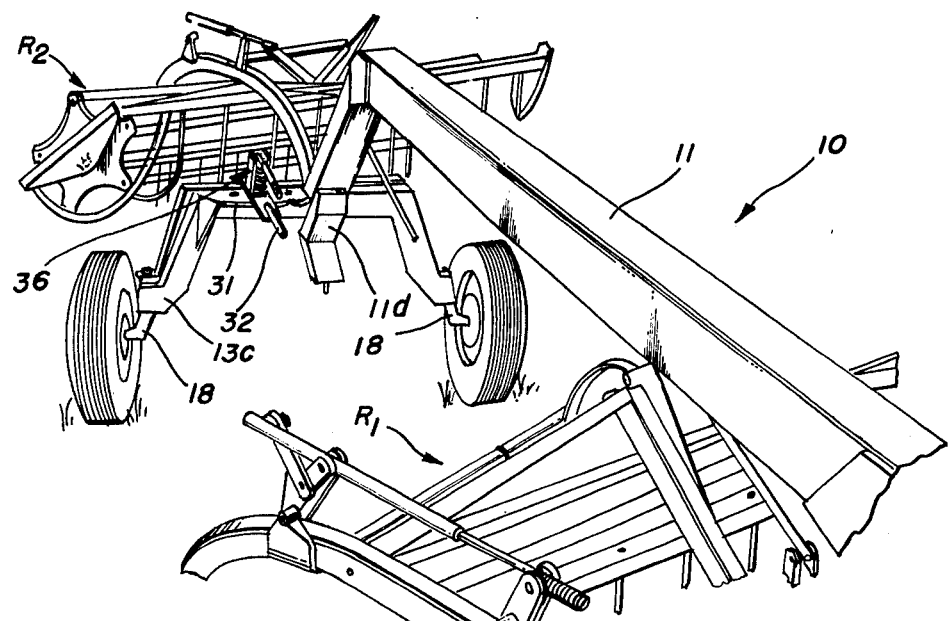
FIG. 8 is a partial perspective view, looking rearwardly, of the hitch according to the invention with rakes connected in transport position.
Figure 9:
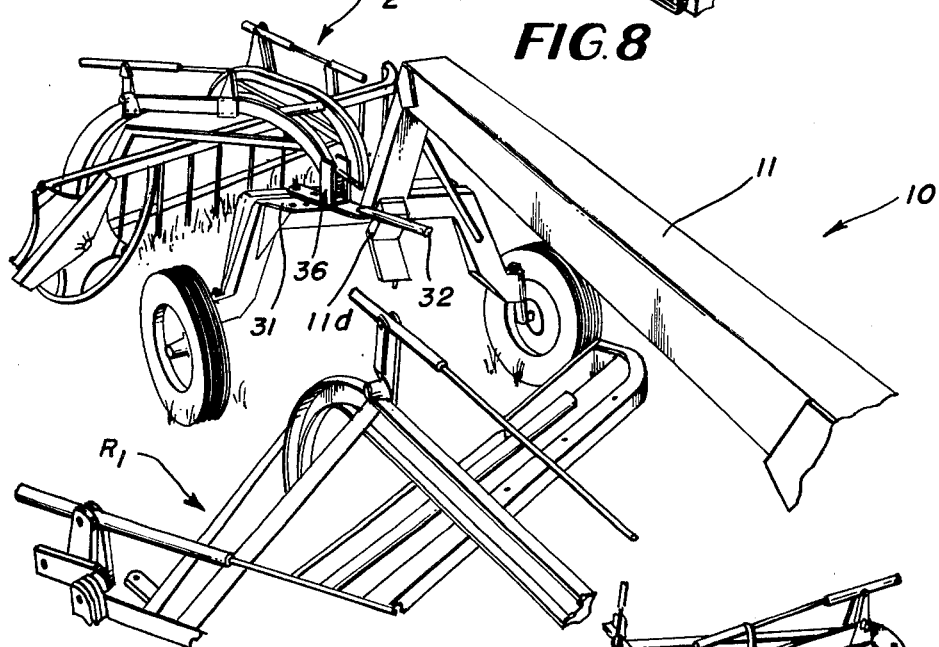
FIG. 9 is a partial perspective view, looking rearwardly, of the hitch according to the invention with rakes connected in a single windrowing mode.
Figure 10:
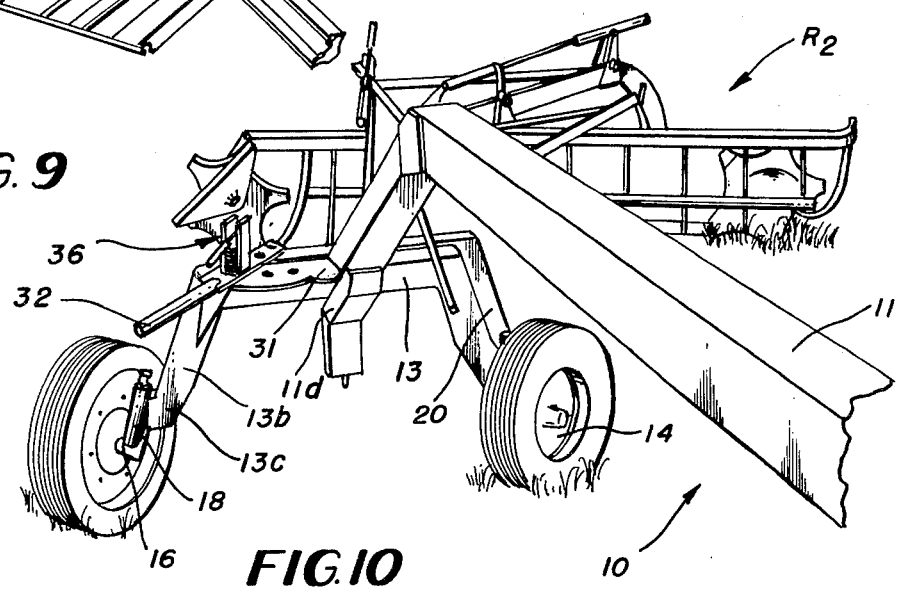
FIG. 10 is a partial perspective view, looking rearwardly, showing the wheels of the hitch of the invention positioned to cause the rear end of the hitch to track to the right of the towing vehicle.
Figures 11, 12:
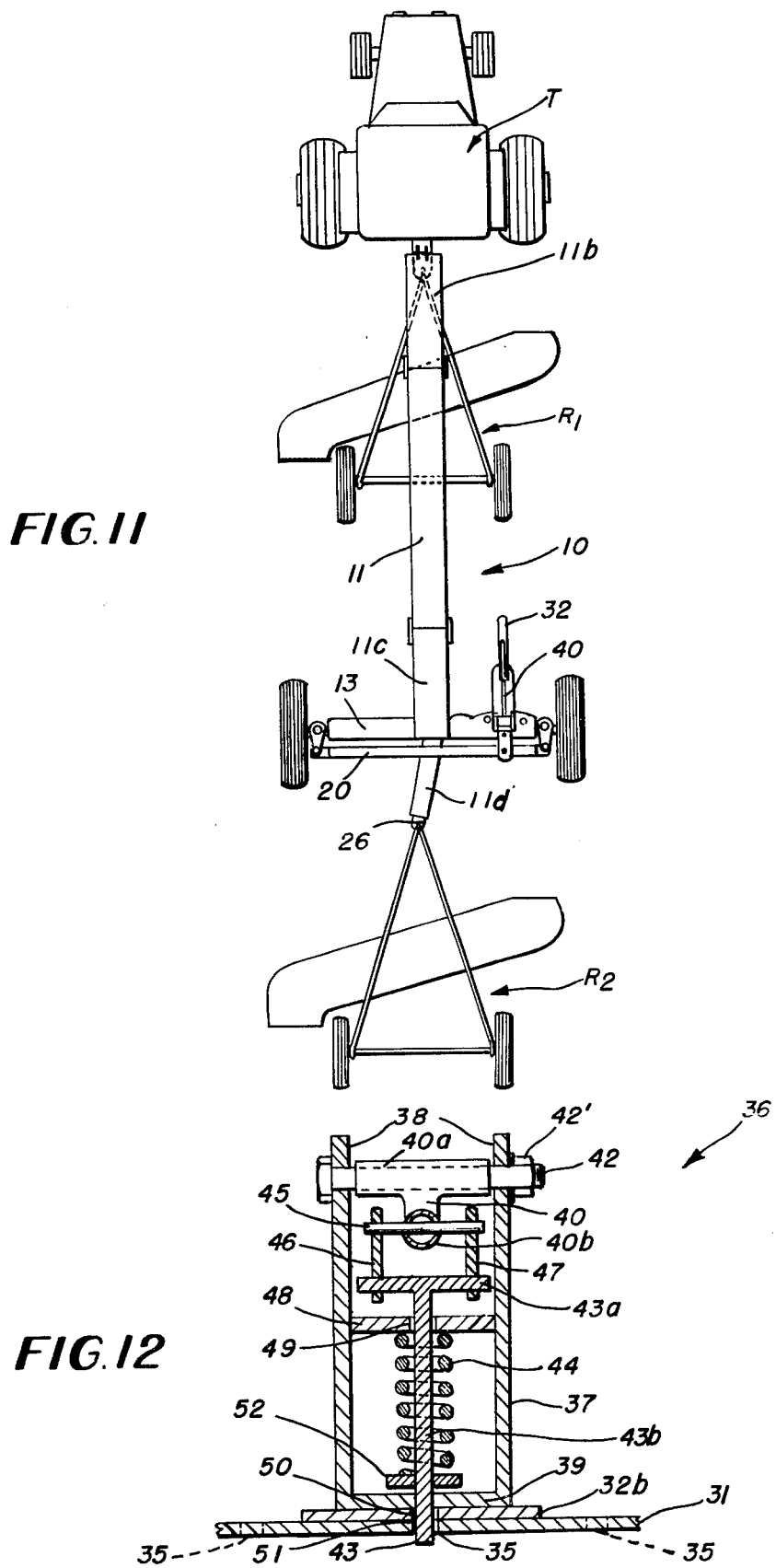
FIG. 11 is a top plan view of the hitch according to the invention showing a pair of rakes being towed in transport position.
FIG. 12 is an enlarged cross sectional view through the wheel offset control latch according to the invention.

Referring to the drawings and particularly to FIGS. 2, 3 and 6, the invention, as indicated by the reference numeral 10, is a hitch device for connecting a plurality of wheeled implements with a towing vehicle to be towed in tandem behind the towing vehicle for transportation, or to be towed in either of a right-hand, or a left-hand laterally spaced staggered relationship for field use. The hitch device 10 is especially suited for connecting a pair of rakes $R_1$ and $R_2$, each having its own wheel supported frame, with the towbar of a tractor T as shown in FIGS. 1, 4, 5 and 11. FIGS. 1 and 11 show the hitch 10 with rakes $R_1$ and $R_2$ connected in tandem behind the tractor T for transportation FIG. 4 shows the hitch 10 with rake $R_2$ laterally spaced to the left and to the rear of rake $R_1$ and FIG. 5 shows the hitch 10 with rake $R_2$ laterally spaced to the right and to the rear of rake $R_1$.

The hitch 10 comprises an arched longitudinal main frame member 11, having hitch means 12 at its front end for pivotal connection to the drawbar of a tractor, and an arched transverse frame member 13, to the top center of which the rear end of the frame member 11 is secured as by welding. The opposite ends of the transverse frame member 13 are each supported above the ground by a wheel 14 with a tire 15. Each wheel 14 is mounted on a stub axle 16 having a king pin 17 upstanding from its inner end. Each king pin 17 is rotatably mounted in a sleeve bearing 18 which is fixed on one end of the transverse frame member 13. A lever 19 is affixed to the top of each king pin 17 for turning the king pin in its sleeve bearing 18 and the levers on the two king pins at opposite sides of the transverse frame member 13 are interconnected by a tie rod 20 in a conventional manner for steering the wheels.

As clearly shown in FIG. 6, the tie rod 20 is arched upwardly similar to the transverse frame member 13 for the purpose of permitting the hitch 10 to pass over windrowed hay or other obstructions in the field without engaging same and either damaging the hitch 10 or dragging the obstruction. They both include a generally linear, top central member, downwardly and outwardly inclined legs at opposite ends of the top central member and short projections angled outwardly from the lower ends of the legs. In the case of the transverse frame member 13, the top central member is designated 13a, the downwardly inclined legs are 13b, and the short projections are 13c. In the case of the tie rod 20, the top central member is designated 20a, the downwardly inclined legs are 20b and the short projections are 20c. The short projections 13c of the transverse frame member 13 carry the sleeve bearings in which the king pins 17 are rotatably mounted. The short projections 20c of the tie rod 20 are pivotally connected to the levers 19 by pivot pins 21.

The main longitudinal frame member 11 includes an elongated top central portion 11a which extends generally horizontally and is elevated sufficiently to permit a rake or other implement attached to the front end of frame member 11 to pass under the longitudinal frame member as it is shifted in position in accordance with the purposes of this invention subsequently to be described.

A steeply downwardly inclined front post portion 11b is rigidly secured at the front end of the top central portion 11a, and a less steeply downwardly inclined rear portion 11c is rigidly secured at the rear end of the top central portion 11a. On the front of the front post portion 11b is mounted the hitch means 12 for connecting the hitch device 10 to the drawbar of a towing vehicle. It includes a pair of vertically spaced, forwardly extending clevis members 22 and 23, adapted to straddle the drawbar of a tractor, and a drop pin 24 adapted to drop through vertically aligned apertures in the clevis members and an aligned aperture in a draw bar to pivotally connect the hitch device 10 to a tractor or other towing vehicle. On the rear of the front post portion 11b behind the hitch means 12 is fixed a short drawbar 25 with aperture 25' therethrough for pivotal connection with a front rake R₁ or other towed implement.

The bottom end of the rear portion 11c of the main longitudinal frame member 11 is rigidly connected to the top central portion of the transverse frame member 13 (FIG. 6). A downward extension 11d from the rear portion 11c carries at its lower end a rearwardly extending drawbar 26 with aperture 27 therein for pivotal connection to a rear rake R₂ or other implement.

The wheels 14 on the opposite ends of the transverse frame member 13 are normally always maintained in parallel relationship to each other by means of the tie rod 20. In order to angle the wheels 14 in selected directions relative to the transverse frame member 13, a wheel offset control means 30 is provided for shifting the tie rod 20 to the right or to the left as indicated by arrows A and B in FIG. 6 and for thereby changing the angle of the wheels relative to the transverse frame member. The transverse frame member 13 as shown in the top plan view of FIG. 3 is perpendicular to the longitudinal axis of the main longitudinal frame member 11. When the wheels 14 of the hitch are directed perpendicular to the axis of the transverse frame member and thus parallel to the axis of the main longitudinal frame member 11 the hitch 10 will track directly behind the towing vehicle. If the wheels 14 are angled to the right or to the left from the position where they are parallel with the longitudinal frame member 11, the rear end of the hitch 10 will shift to the right or to the left until the wheels 14 are in parallel alignment with the direction of travel of the towing vehicle.

The wheel offset control means 30 includes a wheel position plate 31 which is fixed to and extends forwardly from the top central member 13a of the transverse frame member and is substantially flush with the upper surface thereof. A wheel offset control handle 32 is pivoted to the upper surface of the top transverse frame member 13 by vertical pivot pin 33 so that it may be moved parallel to the upper surface of the wheel position plate 31. The control handle 32 includes a forwardly extending hand grip portion 32a and a flat lever arm portion 32b extending rearwardly from the hand grip portion. The lever arm portion is pivoted to the upper surface of the tie rod 20 rearwardly of the fulcrum 33 by pivot pin 34. The wheel position plate 31 has three or more apertures 35 extending therethrough which are located on an arc whose center is the axis of the pivot pin 33. The apertures 35 cooperate with a wheel offset control latch 36 to latch the control handle 32 in selected one of three positions, including a center position and right and left-hand positions.

The wheel offset control latch 36 (see FIG. 12) comprises a U-shaped frame 37 having a pair of horizontally spaced, upright legs 38 connected at their bottom ends by a flat connecting portion 39 which is fixedly secured to the top of the flat lever arm portion 32b. A rearwardly projecting ear portion 38a is coplanar and integral with the top portion of each of the upright legs. Horizontally aligned apertures in the ears 38a of the two legs 38 receive a bolt 42 which provides a pivot support for a latch operating handle 40. The bolt 42 is secured in position by a nut 42'. The handle 40 is of T-shape and includes a tubular cross-head portion 40a, which is pivotally mounted on the bolt 42, and an elongated handle portion 40b extending forwardly between the legs 38 of the latch frame 37. A pivot pin 45 extends transversely through the handle portion 40b a short distance from the cross-head portion 40a and is parallel with the cross-head portion. A pair of links 46 and 47 are pivotally mounted on opposite ends of the pivot pin 45. The links 46 and 47 pivotally support the cross head 43a of a T-shaped latch pin 43 above a fixed bridge member 48 rigidly secured between the legs 38. Aligned apertures 49, 50 and 51 respectively extend centrally through the bridge member 48, the latch frame connecting portion 39 and the wheel offset control handle 32, providing a through passage for reciprocal movement of elongated stem portion 43b of the latch pin 43 which normally extends downwardly therethrough into one of the position apertures 35 in the wheel position plate 31. A compression coil spring 44 is positioned surrounding the latch pin stem 43b between the fixed bridge 48 and a disk 52 which is fixed to the lower portion of latch pin stem 43b above the connecting portion 39 of the latch frame 36. The compression spring 44 normally biases the latch pin downwardly into latching position as shown in FIG. 12. In order to release the latch 36 so that the wheel offset control handle 32 can be moved over the wheel position plate 31, the latch pin 43 is lifted by lifting the free end of the latch operating handle 40. In doing so the handle pivots about its pivot pin 42, the cross pin 45 is lifted, lifting the links 46 and 47 which in turn lift the cross head 43a of the latch pin 43 and thus the latch pin stem 43b is lifted until it disengages the wheel position plate 31. In lifting the latch pin 43, the coil spring 44 is compressed so that when the handle 40 is released the coil spring 44 will again force the latch pin 43 downwardly, and the latch pin will lock in the first position aperture 35 in the wheel position plate with which it becomes aligned upon movement of the wheel position control handle 32.

As seen in FIG. 3, the lower end, or tongue, of the rear extension 11d is angularly offset to the left of the main portion of the longitudinal frame 11 inorder to properly position the back rake $R_2$ with respect to the windrow delivered by the front rake $R_1$. An offset of the drawbar aperture 27 from the longitudinal axis of the main portion of frame 11 by approximately three inches has been found to be satisfactory, however, the amount of offset required, if any, will depend upon the implements being towed.

Operation of the Invention

The operation of the invention will be apparent from the foregoing description.

A pair of rakes, $R_1$ and $R_2$, or other implements, are connected to the front and rear hitch elements 25 and 26 respectively of the hitch 10 which is connected by the front clevis elements 23 and 24 and drop pin 24 to the tow bar of a tractor or other tow vehicle.

For transportation of the rakes along a highway, it is necessary to have the rakes track in approximate tandem alignment with the tractor inorder to utilize as little of the width of the highway as possible. To condition the hitch and towed implements for the transportation made, the wheel offset control means 30 is positioned as shown in FIG. 3 with the wheel offset control handle 32 locked in the central, or neutral, position by the wheel offset control latch pin 43 projecting through the center index aperture 35 as shown in FIG. 12. In the neutral position of the wheel offset control handle 32, the dirigible hitch wheels on opposite sides of the transverse frame member 13 are in parallel with the longitudinal main frame member 11.

For field use, depending upon the amount of hay on the ground, the operator will select to tow the rakes in either a single or a double windrowing mode. If the hay on the ground is sparce, or very dry, the operator may select to tow the rakes in a single windrowing mode, as shown in FIG. 4, wherein the trailing rake picks up the hay delivered by the forward rake and combines it with hay which the trailing rake picks up from the ground over which it travels. The hitch 10 is conditioned to tow the two left-hand side delivery rakes $R_1$ and $R_2$ in the single windrowing mode by lifting the wheel offset control latch handle 40 to lift the latch pin 43 from the center index aperture 35, in which it was located during the transportation mode, and by moving the control handle 32 to the left (toward the longitudinal frame member 11). The wheels 14 are thereby angled to the left causing the rear end of the hitch to swing to the left until the wheels reach a position wherein they are again parallel with the direction of travel of the towing vehicle. Since the front rake $R_1$ is connected to the hitch 10 close behind the connection of the hitch 10 to the tractor drawbar, as seen in FIG. 11, it continues to track in approximate tandem alignment with the tractor T while the arched ongitudinal frame member of the hitch swings over the front rake $R_1$ to position the rear end of the hitch and the rake $R_2$ in an offset position to the left of the front rake. The amount of offset is predetermined so that the trailing rake $R_2$ will overlap a left-hand portion of the swath covered by the front rake $R_1$. The predetermined amount of left-hand offset is used in determining the position of the left-hand index aperture 35 in the index plate 31 so that when the latch pin 43 comes into alignment with the left offset position aperture 35 by moving the offset control handle 32 to the left, the latch pin 43 is projected by the spring 44 into the left-offset index aperture. The wheel offset control means 30 is thereby locked in position to provide the hitch and rear rake $R_2$ with the correct amount of left-hand offset for the single windrowing mode.

If the hay lying on the ground is thick and heavy, the operator may select to operate the hitch in the double windrowing mode wherein each of the rakes $R_1$ and $R_2$ deliver separate windrows $W_1$ and $W_2$ as shown in FIG. 5. This is done to prevent the formation of a combined windrow with an excessively large volume of hay. The two smaller windrows are advantageous especially if the hay is damp or wet and must dry before it is baled. To condition the hitch 10 in the double windrowing mode, the operator moves the wheel offset control handle to the right of the central, or neutral, position until the latch pin 43 drops into the right-hand index aperture 35. The wheels 14 are thereby angled to the right causing the rear end of the hitch 10 and the rake $R_2$ to move to the right until the wheels 14 reach a position wherein they are again parallel with the direction of travel of the towing vehicle. The amount of right-hand offset is predetermined so that the trailing vehicle will overlap the right-hand portion of the front rake $R_1$ in order to avoid leaving a strip of hay on the ground between the windrows $W_1$ and $W_2$. As described with respect to the left offset position aperture, the right offset position aperture 35 is located in accordance with the predetermined amount of right-hand offset of the rake $R_2$ from the front rake $R_1$.

For implements other than rakes, and even for rakes of different sizes, the amount of offset of one implement from another, in field use may differ. Index apertures 35 will therefore be provided in the wheel position plate 31 in accordance with the requirements of the implements to be towed. The index plate may be provided with a multiplicity of appropriately spaced index apertures so that the hitch 10 is adapted for universal use with rakes of different sizes and for other implements requiring different offsets in field use.

While the rakes $R_1$ and $R_2$ are both illustrated as being left-hand delivery rakes, it is within the intended scope of this invention that both rakes may be for right-hand delivery or one rake may be for right-hand delivery and the other rake may be for left-hand delivery.

If the rakes are both right-hand delivery rakes, the hitch and rakes will be in a single windrowing mode when the rear rake is offset to the right of the front rake preferably allowing some overlap, and the hitch and rakes will be in a double windrowing mode when the rear rake is offset to the left of the front rake allowing some overlap.

If the two rakes are mixed left-hand and right-hand delivery rakes, the hitch and rakes will be in a single windrowing mode when the right-hand delivery rake is offset to the rear and to the left of the left-hand delivery rake, and in a double windrowing mode when the right-hand delivery rake is offset to the rear and to the right of the right-hand delivery rake.

The invention has been described in detail for the purpose of illustration, but it will be obvious that numerous modifications and variations may be resorted to within the spirit and scope of the invention without departing from the claims.

I claim:

1. A dual implement hitch for side delivery hay rakes and other implements, whereby two implements, each having its own wheel supported frame may be towed by a single vehicle and selectively positioned by operation of a control means to track one behind the other in tandem, to track one behind and offset laterally to the left of the other, and to track one behind and offset laterally to the right of the other, comprising an arched longitudinal main frame member having front and rear ends, front hitch means on the front end of said arched longitudinal main frame member for pivotally supporting the front end of said longitudinal member entirely on said vehicle, an arched transverse frame member rigidly connected to and supporting the rear end of said longitudinal main frame member, a pair of dirigible ground engaging wheels connected to and supporting opposite ends of said arched transverse frame member, tie rod means connected to said pair of dirigible wheels for maintaining parallel relationship of said wheels, a first hitch element means connected to and extending rearwardly from the front end of said longitudinal main frame member for pivotally connecting a first implement to said hitch under the arch of said longitudinal main frame member whereby said longitudinal main frame member may swing over top of said first implement, a second hitch element means connected to and extending rearwardly from the rear end of said longitudinal main frame member for pivotally connecting a second implement to said hitch, and wheel offset control means for selectively positioning said wheels to one of: a position parallel with said longitudinal main frame member causing said second implement to track in tandem with said first implement, a left offset position wherein the second implement tracks to the left of the first implement and a right offset position wherein the second implement tracks to the right of the first implement, said arched transverse frame member comprising a transverse top central member having opposite ends, and a pair of depending legs rigidly joined to and depending from the opposite ends of said transverse top central member, said legs having lower extremities remote from said transverse top central member, and each of the depending legs of said pair of legs having means for dirigibly connecting one of said dirigible ground engaging wheels thereto adjacent the lower extremity thereof, said transverse top central member being elevated by said legs and by said ground engaging wheels above the ground by a height sufficient for passage of a windrow of hay thereunder without interference, and said tie rod means being elevated at least as high as said transverse top central member.

2. The dual implement hitch of claim 1 wherein said arched longitudinal main frame member comprises a steeply downwardly inclined front post portion, an elongated top central portion rigidly connected to the top of said front post portion and extending rearwardly therefrom and a rear portion rigidly connected to and extending rearwardly and downwardly from the rear end of said top central portion, said rear portion being rigidly secured at its lower end to an elevated medial portion of said arched transverse frame member, said front hitch means comprising clevis members secured to the front of said front post portion, said first hitch element means comprising a short drawbar rigidly attached behind said front post portion.

3. The dual implement hitch of claim 2 wherein the longitudinal main frame member includes an extension rigidly secured to said rear portion and extending rearwardly and downwardly from said rear portion at an angle diverging laterally from a vertical plane extending through the longitudinal axis of said longitudinal frame member, said second hitch element means comprising a short drawbar rigidly secured to the rear end of said extension.

4. The dual implement hitch of claim 1 wherein said tie rod means includes a tie rod generally of the same arched configuration as said arched transverse frame member and is parallel thereto.

5. The dual implement hitch of claim 1 wherein said wheel offset control means comprises a wheel position index plate rigidly secured to the top of said transverse frame member and a wheel offset control handle, handle pivot means pivotally connecting said control handle intermediate its ends to the top of said plate for swinging movement over said plate, means pivotally connecting one end of said wheel offset-control handle to said tie rod, a hand grip being provided at the other end of said handle, said wheel position index plate having index holes arranged on an arc whose center of radius is the pivot means connecting said control handle to said plate, a latch pin hole extending through said handle and radially spaced from said handle pivot means a distance equal to the radius of said arc, a wheel offset-control latch mounted on top of said handle comprising a latch frame mounted over said latch pin hole in said handle, a latch pin supported by said latch frame for reciprocation therein, and spring bias means normally projecting said latch pin through said latch pin hole into a selected one of said index holes in said plate, and handle means connected to said latch frame and to said latch pin for lifting said latch pin from said index holes.

6. In combination a dual implement hitch adapted to be connected to a towing vehicle in trailing relation thereto, said dual implement hitch having a pair of hitch element means thereon spaced in a front and rear direction with respect to each other, and a pair of side delivery rake units each having its own wheel supported independent frame, and both of which deliver raked material in the same direction relative to the direction of travel of the towing vehicle, one rake unit being connected to one of said hitch element means adjacent the front of said hitch, and the other rake unit being connected to the other of said hitch element means at the rear of said hitch, said dual implement hitch comprising an arched longitudinal main frame member having front and rear ends, front hitch means on the front end of said arched longitudinal main frame member for pivotally supporting the front end of said longitudinal member on said vehicle, an arched transverse frame member rigidly connected to and supporting the rear end of said longitudinal main frame member, a pair of dirigible ground engaging wheels connected to and supporting opposite ends of said arched transverse frame member, tie rod means connected to said pair of dirigible wheels for maintaining parallel relationship of said wheels, said one hitch element means being connected to and extending rearwardly from the front end of said longitudinal main frame member for pivotally connecting said one rake unit to said hitch under the arch of said longitudinal main frame member whereby said longitudinal main frame member may swing over top of said one rake unit, said other hitch element means being connected to and extending rearwardly from the rear end of said longitudinal main frame member for pivotally connecting said other rake unit to said hitch, and wheel offset control means for selectively positioning said wheels to one of: a position parallel with said longitudinal main frame member causing said other rake unit to track in tandem with said one rake unit in a transport mode, a left offset position wherein said other rake unit tracks to the left of said one rake unit in a first operating mode, and a right offset position wherein said other rake unit tracks to the right of said one rake unit in a second operating mode, said first and second operating modes being either a single windrowing mode in which said other rake unit picks up the hay delivered by said one rake unit and delivers a single windrow into which the output of both rake units is combined, or a double windrowing mode in which both rake units each deliver a separate windrow, said first and second operating modes being dependent upon the direction of delivery of said side delivery rakes, said arched transverse frame member comprising a transverse top central member having opposite ends, and a pair of depending legs rigidly joined to and depending from the opposite ends of said transverse top central member, said legs having lower extremities remote from said transverse top central member, and each of the depending legs of said pair of legs having means for dirigibly connecting one of said dirigible ground engaging wheels thereto adjacent the lower extremity thereof, said transverse top central member being elevated by said legs and by said ground engaging wheels above the ground by a height sufficient for passage of a windrow of hay thereunder without interference and said tie rod means being elevated at least as high as said transverse top central member.

7. The dual implement hitch of claim 6 wherein said arched longitudinal main frame member comprises a steeply downwardly inclined front post portion, an elongated top central portion rigidly connected to the top of said front post portion and extending rearwardly therefrom, and a rear portion rigidly connected to and extending rearwardly and downwardly from the rear end of said top central portion, said rear portion being rigidly secured at its lower end to an elevated medial portion of said arched transverse frame member, said front hitch means comprising clevis members secured to the front of said front post portion, said one hitch element means comprising a short drawbar rigidly attached behind said front post portion.

8. The dual implement hitch of claim 7 wherein the longitudinal main frame member includes an extension rigidly secured to said rear portion and extending rearwardly and downwardly from said rear portion at an angle diverging laterally from a vertical plane extending through the longitudinal axis of said longitudinal frame member, said other hitch element means comprising a short drawbar rigidly secured to the rear end of said extension.

9. The dual implement hitch of claim 6 wherein said tie rod means includes a tie rod generally of the same arched configuration as said arched transverse frame member and is parallel thereto.

10. The dual implement hitch of claim 6 wherein said wheel offset control means comprises a wheel position index plate rigidly secured to the top of said transverse frame member and a wheel offset control handle, handle pivot means pivotally connecting said control handle intermediate its ends to the top of said plate for swinging movement over said plate, means pivotally connecting one end of said wheel offset-control handle to said tie rod, a hand grip being provided at the other end of said handle, said wheel position index plate having index holes arranged on an arc whose center of radius is the pivot means connecting said control handle to said plate, a latch pin hole extending through said handle and radially spaced from said handle pivot means a distance equal to the radius of said arc, a wheel offset-control latch mounted on top of said handle comprising a latch frame mounted over said latch pin hole in said handle, a latch pin supported by said latch frame for reciprocation therein, and spring bias means normally projecting said latch pin through said latch pin hole into a selected one of said index holes in said plate, and handle means connected to said latch frame and to said latch pin for lifting said latch pin from said index holes.

11. The combination of claim 6 wherein both of said rake units have left-hand delivery and said first operating mode is a single windrowing mode, and said second operating mode is a double windrowing mode.

12. The combination of claim 6 wherein both of said rake units have right-hand delivery and said first operating mode is a double windrowing mode, and said second operating mode is a single windrowing mode.

13. In combination a dual implement hitch adapted to be connected to a towing vehicle in trailing relation thereto, a pair of hitch element means on said frame spaced in a front and rear direction with respect to each other, and a pair of side delivery rake units each having its own wheel supported independent frame, one rake unit being connected to one of said hitch element means adjacent the front of said hitch, and the other rake unit being connected to the other of said hitch element means at the rear of said hitch, said dual implement hitch comprising an arched longitudinal main frame member having front and rear ends, front hitch means on the front end of said arched longitudinal main frame member for pivotally supporting the front end of said longitudinal member on said vehicle, an arched transverse frame member rigidly connected to and supporting the rear end of said longitudinal main frame member, a pair of dirigible ground engaging wheels connected to and supporting opposite ends of said arched transverse frame member, tie rod means connected to said pair of dirigible wheels for maintaining parallel relationship of said wheels, said one hitch element means being connected to and extending rearwardly from the front end of said longitudinal main frame member for pivotally connecting said one rake unit to said hitch under the arch of said longitudinal main frame whereby said longitudinal main frame member may swing over top of said one rake unit, said other hitch element means being connected to and extending rearwardly from the rear end of said longitudinal main frame member for pivotally connecting said other rake unit to said hitch, and wheel offset control means for selectively positioning said wheels to different angular positions with respect to the longitudinal main frame member including at least a neutral position wherein said wheels are parallel to said longitudinal frame member, a right-offset position wherein said wheels are angled to the right with with respect to said longitudinal main frame member, and a left-offset position wherein said wheels are angled to the left with respect to said longitudinal main frame member, said arched transverse frame member comprising a transverse top central member having opposite ends, and a pair of depending legs rigidly joined to and depending from the opposite ends of said transverse top central member, said legs having lower extremities remote from said transverse top central member, and each of the depending legs of said pair of legs having means for dirigibly connecting one of said dirigible ground engaging wheels thereto adjacent the lower extremity thereof, said transverse top central member being elevated by said legs and by said ground engaging wheels above the ground by a height sufficient for passage of a windrow of hay thereunder without interference and said tie rod means being elevated at least as high as said transverse top central member.

14. The dual implement hitch of claim 13 wherein said arched longitudinal main frame member comprises a steeply downwardly inclined front post portion, an elongated top central portion rigidly connected to the top of said front post portion and extending rearwardly therefrom, and a rear portion rigidly connected to and extending rearwardly and downwardly from the rear end of said top central portion, said rear portion being rigidly secured at its lower end to an elevated medial portion of said arched transverse frame member, said front hitch means comprising clevis members secured to the front of said front post portion, said one hitch element means comprising a short drawbar rigidly attached behind said front post portion.

15. The dual implement hitch of claim 14 wherein the longitudinal main frame member includes an extension rigidly secured to said rear portion and extending rearwardly and downwardly from said rear portion at an angle diverging laterally from a vertical plane extending through the longitudinal axis of said longitudinal frame member, said other hitch element means comprising a short drawbar rigidly secured to the rear end of said extension.

16. The dual implement hitch of claim 13 wherein said tie rod means includes a tie rod generally of the same arched configuration as said arched transverse frame member and is parallel thereto.

17. The dual implement hitch of claim 13 wherein said wheel offset control means comprises a wheel position index plate rigidly secured to the top of said transverse frame member and a wheel offset control handle, handle pivot means pivotally connecting said control handle intermediate its ends to the top of said plate for swinging movement over said plate, means pivotally connecting one end of said wheel offset-control handle to said tie rod, a hand grip being provided at the other end of said handle, said wheel position index plate having index holes arranged on an arc whose center of radius is the pivot means connecting said control handle to said plate, a latch pin hole extending through said handle and radially spaced from said handle pivot means a distance equal to the radius of said arc, a wheel offset-control latch mounted on top of said handle comprising a latch frame mounted over said latch pin hole in said handle, a latch pin supported by said latch frame for reciprocation therein, and spring bias means normally projecting said latch pin through said latch pin hole into a selected one of said index holes in said plate, and handle means connected to said latch frame and to said latch pin for lifting said latch pin from said index holes.

* * * * *